T. D. BURRALL.
Mower.
No. 690. Reissued April 12, 1859.
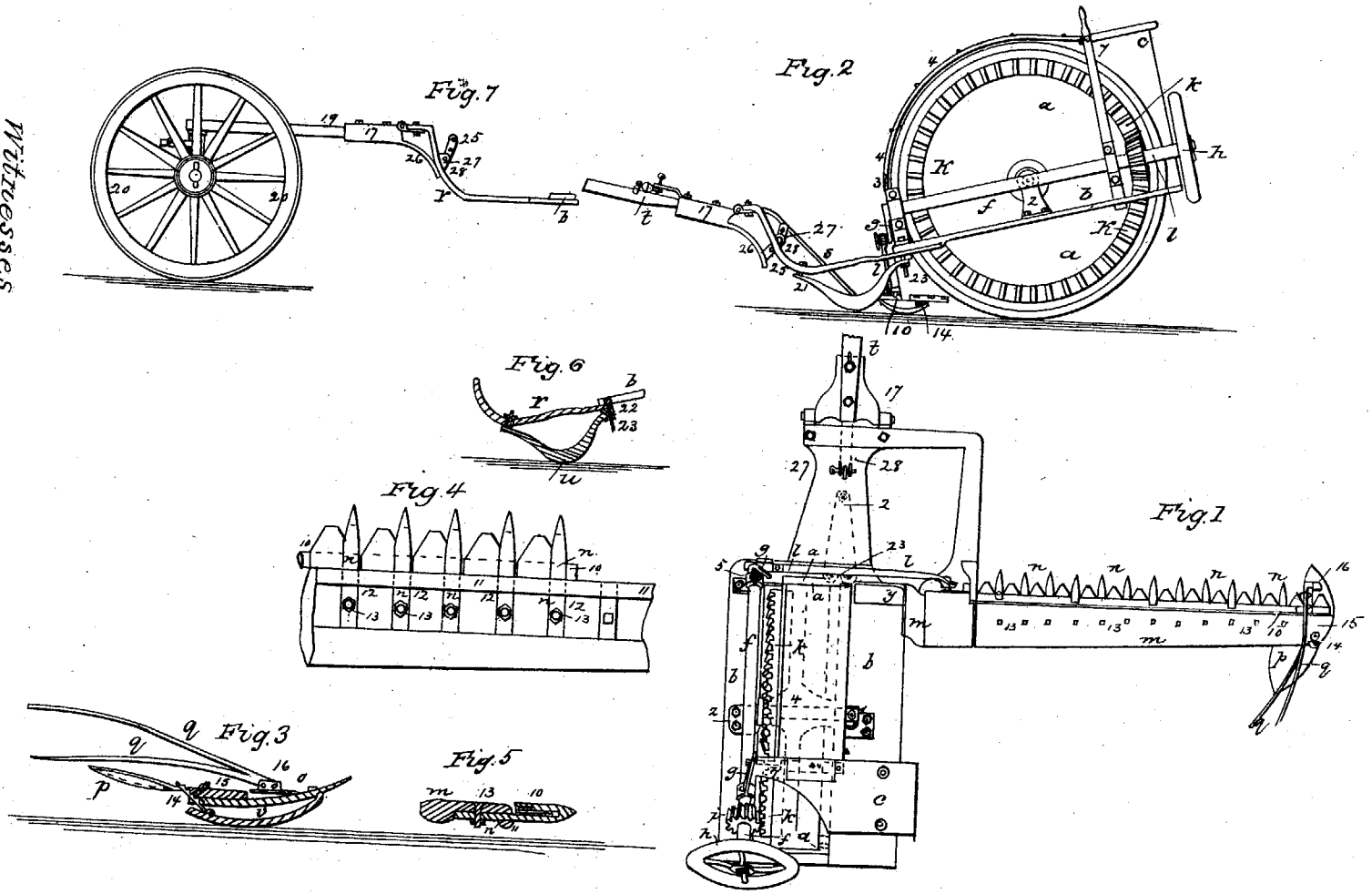
Witnesses
E. F. Brown
W. D. Burrall
Inventor
Thomas D. Burrall
N. PETERS, Photo-Lithographer, Washington, D. C.

UNITED STATES PATENT OFFICE.

THOMAS D. BURRALL, OF GENEVA, NEW YORK.

IMPROVEMENT IN HARVESTERS.

Specification forming part of Letters Patent No. 14,441, dated March 18, 1856; Reissue No. 690, dated April 12, 1859.

*To all whom it may concern:*

Be it known that I, THOMAS D. BURRALL, of Geneva, in the county of Ontario and State of New York, have invented, made, and applied to use certain new and useful Improvements in Mowing and Reaping Machines; and I do hereby declare that the following is a full, clear, and exact description of the construction and operation of the same, reference being had to the annexed drawings, making part of this specification, wherein—

Figure 1 is a plan of the machine complete. Fig. 2 is a side elevation of the same. Fig. 3 is a section, in larger size, of the shoe at the outer end of the finger-board, showing also the vibrating separator to clear the cut from the uncut grass. Fig. 4 is a plan from beneath of the finger-board; and Fig. 5 is a section of the same, showing the method of attaching the guards. Fig. 6 is a section of the supporting-shoe near the wheel, and Fig. 7 represents the manner in which I convert the mowing-machine into a reaping-machine.

The like marks of reference denote the same parts in all the figures.

The nature of my said invention consists in a peculiar manner of supporting and adjusting the finger-board to the required height from the ground, and in the method of constructing and arranging the gearing.

*a* is the driving-wheel, which may be provided with ribs across its surface, to insure its rotation when drawn over the ground. 1 is the shaft for said wheel, formed with a bent arm, 2, turned at right angles with the shaft, and passed down and bolted onto the frame *b*. The shaft 1, being parallel from the end to the arm 2, is to be entered through the hole in the main wheel *a*, and the end received in and bolted to a standard or box, *z*. The frame *b* is fitted to receive the parts of the apparatus, and provided with a vertical semicircular guard, 3, to which a curved guard, 4, is attached, covering the main driving-wheel and protecting the driver, if sitting on the seat *c*, which is provided for his use, and on the frame *b* a raised guard, *y*, prevents the driver's feet sliding off or being damaged by the moving parts of the machine.

*k* is a face-gear wheel on the side of the driving-wheel *a*, communicating motion to a pinion, *i*, on the horizontal or line shaft *f*. 5 is a journal near the forward end of said shaft, so fitted as to allow the pinion *i* to be thrown in and out of gear by means of a lever, *g*, jointed by a fulcrum-pin to the frame *b* at 24. On the lever *g* a box, 6, receives the shaft *f*, and near the upper end of said lever *g* a slide and link, 7, are connected, moving in a recess under the seat *c* or other suitable slide, through which slide a pin, 8, is passed, to hold the pinion *i* in or out of gear. *h* is a balance-wheel on the back end of the shaft *f*, by which the rotation of said shaft is rendered uniform. On the forward end of the shaft *f* a crank, 9, is fitted, communicating a vibrating motion to the cutter-bar 10 by means of the connecting-rod *l*. *m'* is a descending arm, upon the flat end of which the finger-board *m* is attached by bolts, as shown. The cutter-bar 10 and cutters are constructed in any usual manner, and work in slots in the fingers or guards *n*, cutting off the grass or grain in the usual manner; and every third or fourth guard should come over the cutter-bar, as shown in Fig. 1, to hold the same down in place.

The finger-board is constructed with a rib, 11, (see Figs. 4 and 5,) on the front edge of the under side, and a mortise, 12, is cast in said finger-board, passing in from the front thereof at the place where each guard is required. In order therefore to enter and secure each guard *n* in place, all that has to be done is to slide the lower part of said guard into the mortise 12 and secure the same by a bolt, 13, passing through the finger-board *m* and guard *n*; and the bolt 13, being formed with a countersunk head, offers no obstruction to the grass or grain passing away over the finger-board, and the rib 11 prevents the guards from working loose or becoming detached and injuring the cutters, even should one of the nuts work off from its bolt 13.

At the end of the finger-board *m* a pointed shoe, *o*, is attached, to separate the cut from the uncut grass, and beneath this is a movable shoe, *v*, jointed at its forward end to the shoe *o*, (see Fig. 3,) and at the back end a rack piece, 14, is jointed to the shoe *v*, passing up at the back of the finger-board, and having a slot through it, and a screw, 15, passing through the finger-board, by means of which the finger-board can be raised or lowered on the shoe to cut at the required height.

On the outer end of the finger-board *m*, at the back edge, I attach a plate, *p*, and over the shoe *o*, at 16, I attach one, two, or more thin iron, steel, or other metal bars, *f*, (I prefer two steel bars,) and curve their back ends toward the main wheel *a*. The operation of this part is that the grass that is cut next the uncut grass, as it passes over the finger-board *m*, is received on the shoe *p*, and the curved separators *q*, by their vibration as the machine is drawn along, pass the grass away continuously and toward the driving-wheel, thereby leaving a sufficient space in front of the guard *s*, between the cut and uncut grass, to prevent the cut grass from dragging down the standing grass in cutting the next swath.

*r* is the forward part or neck of the frame with the guard *s*, and 17 is a socket hinged onto the forward edge of the part *r*, receiving the tongue *t*, to which the animal or animals used to draw the machine are attached.

*u* is a shoe attached at its forward end to the frame *r* and at the back end by means of bolts 23 to the frame *b*. These bolts 23 should be sufficiently long to allow of a block, 22, being placed between the shoe and frame to raise the finger-board to the height required for mowing.

In order to dispense with the shoe *u*, if found most convenient to use a stiff pole and support the machine thereby, I make use of the means shown in Figs. 1, 2, and 7, which consist of a curved arc, 25, on an arm, 26, which arm is permanently attached to the under side of the socket 17, and the arc 25 is provided with holes, and passes through a mortise in the part *r* of the frame, between ears 28, that have a hole through them on the line of the holes in arc 25. It will now be evident that if the machine rests on the shoe *u* the arc 25 will move back and forth in its mortise if any inequality of the ground alters the relative position of the frame of the machine to the outer end of the pole, where it is attached to the animal drawing the machine; and if a pin, 27, be entered through the ears 28 and one of the holes in the arc 25, the tongue or pole *t* becomes a permanent attachment that can be made use of in either mowing or reaping, for which latter use the pole will require to be attached nearly parallel to the bed *b*, the end of which pole, being connected to the animals, elevates the finger-board and cutters the amount required; and truck-wheels 20 may be used to sustain the machine at the proper height for reaping, in which case a short tongue, 19, should be attached in place of the pole *t* and the animals hitched to the truck-wheels, and to convert the mowing-machine into a reaper the vibrating separators *q* should be removed and a platform or apron attached behind the finger-board *m*, onto which the grain falls and is raked off as usual, and a wheel must be provided on the side of this platform to raise up the outer end of the finger-board as now in use.

I am well aware that gearing has been used in a variety of forms to convey motion from the main wheel to the vibrating cutter. Therefore my claims do not relate to any such arrangement in itself; but I am not aware of any arrangement prior to my present invention in which the shaft of the main wheel has been so constructed or supported that a shaft, *f*, could be used running across the end of the same sufficiently close to the main wheel that a small pinion could be used, thereby obtaining the necessary speed of vibration for the cutter-bar by a single gearing, and that on a long shaft in a compact form and in such a manner that the pinion can be easily thrown into and out of gear; whereas if a single pinion were used on a short shaft that did not cross the end of the main shaft difficulty would exist in throwing the same into and out of gear.

It will be seen that the bent arm 2 of the shaft 1 allows said shaft to be attached at each end to the frame, and my machine is strong, compact, durable, and reliable in use.

What I claim as my invention, and desire to secure by Letters Patent, is—

1. The shoe-piece *v* and rack 14, to adjust the height of the outer end of the finger-board, substantially as and for the purposes specified.

2. The shaft *f*, passing across the end of and nearly at right angles to the shaft 1 of the main wheel *a*, when fitted in such a manner that its pinion *i* can be thrown into and out of gear with the face-wheel *k*, for the purposes and substantially as specified.

In testimony whereof I have hereunto set my signature this 12th day of March, 1859.

THOMAS D. BURRALL.

Witnesses:
E. J. BURRALL,
W. D. BURRALL.